(12) United States Patent
Lamparter

(10) Patent No.: US 6,477,978 B2
(45) Date of Patent: *Nov. 12, 2002

(54) CROSSING ARM ASSEMBLY

(75) Inventor: Ronald C. Lamparter, Grosse Pointe Shores, MI (US)

(73) Assignee: Transpec, Inc., Sterling Heights, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/767,469

(22) Filed: Jan. 23, 2001

(65) Prior Publication Data

US 2001/0004873 A1 Jun. 28, 2001

Related U.S. Application Data

(63) Continuation of application No. 08/871,737, filed on Jun. 9, 1997, now Pat. No. 6,234,105.

(51) Int. Cl.⁷ .......................... B60Q 11/00; B60R 19/48
(52) U.S. Cl. ...................... 116/28 R; 116/52; 293/117; 180/271; 180/281; 280/762
(58) Field of Search .................. 116/28 R, 35 R, 116/51, 52, 53, 54; 280/762; 49/49, 381; 180/271, 281; 293/117

(56) References Cited

U.S. PATENT DOCUMENTS

| | | |
|---|---|---|
| 1,086,315 A | 2/1914 | Davis |
| 1,933,244 A | 10/1933 | Denny |
| 2,079,112 A | 5/1937 | Eichelsdoerfer |
| 2,688,303 A | 9/1954 | Leander |
| 2,842,876 A | 7/1958 | Chicoine et al. |
| 3,153,398 A | 10/1964 | Runkle et al. |
| 3,236,552 A | 2/1966 | Percifull |
| 4,026,069 A | * 5/1977 | Bohnett .......................... 49/49 |
| 4,318,079 A | 3/1982 | Dickinson |
| 4,364,200 A | * 12/1982 | Cobb ............................. 49/49 |
| 4,559,518 A | * 12/1985 | Latta, Jr. .................. 116/28 R |
| 4,697,541 A | 10/1987 | Wicker |
| 4,956,630 A | 9/1990 | Wicker |
| 5,199,754 A | 4/1993 | Freeman |
| 5,226,686 A | * 7/1993 | Triggs et al. ................ 293/117 |
| 5,357,239 A | 10/1994 | Lamparter |
| 5,383,420 A | 1/1995 | Dundorf |
| 5,620,219 A | 4/1997 | Servant |
| 5,719,553 A | * 2/1998 | Lamparter ................ 116/28 R |

* cited by examiner

*Primary Examiner*—Diego Gutierrez
(74) *Attorney, Agent, or Firm*—Reising, Ethington, Barnes, Kisselle, Learman & McCulloch, P.C.

(57) ABSTRACT

A crossing arm assembly that includes either one or two hollow, tapered fishing rod bodies cantilevered at their butt ends to a beam-mounting portion of a combined pivot/bracket. A crosspiece connects the tips of the rods. The combined pivot/bracket pivotally attaches to a support at the front end of a bus to block pedestrian traffic from crossing immediately in front of the bus when the bus is stopped. The rods are tapered in mass and cross-sectional area from their butt ends to their tips. The taper concentrates rod mass closer to the support to reduce the tendency of cantilevered rods to sag under their own weight and/or to swing forward as the bus decelerates. The taper also increases rod flexibility to prevent plastic rod deformation and to reduce loads on the support when external forces are applied to the rods. A flap is pivotally attached to one of the rods to increase beam visibility without adding significant wind resistance. The combined pivot/bracket has a U-shaped body with a vertical beam integrally connecting upper and lower pivot arms. A rod-mounting boss extends integrally outward from the beam. Upper and lower receptacles in the rod-mounting boss receive the butt ends of the two rods.

20 Claims, 4 Drawing Sheets

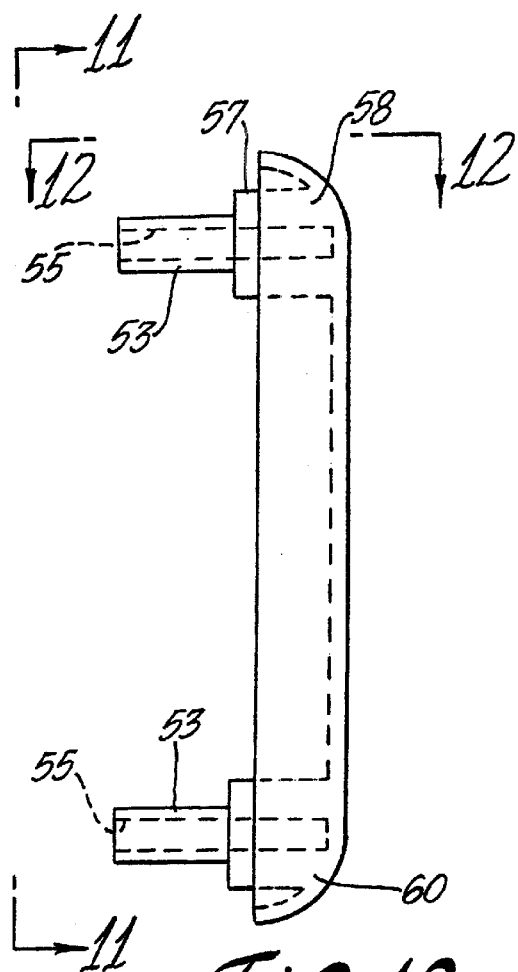
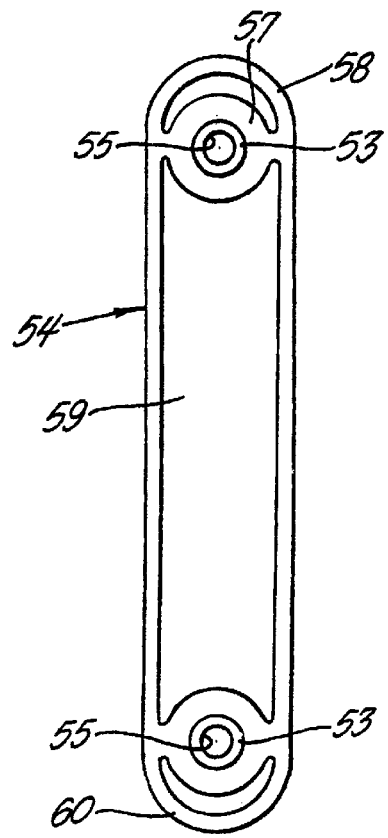
Fig. 10
Fig. 11
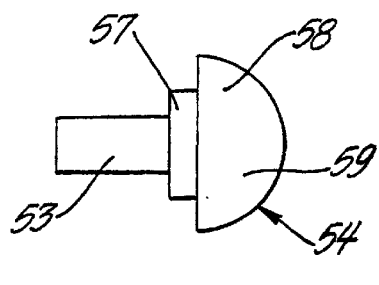
Fig. 12
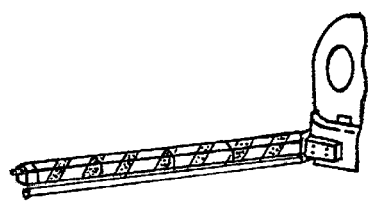
Fig. 13

CROSSING ARM ASSEMBLY

This is a continuation of U.S. Ser. No. 08/871,737 filed Jun. 9, 1997, now U.S. Pat. No. 6,234,105.

TECHNICAL FIELD

This invention relates generally to safety equipment for school busses and more particularly to a crossing arm assembly configured to mount on the front end of a school bus.

BACKGROUND OF THE INVENTION

School bus crossing arms are designed to extend to a perpendicular position relative to a front bus bumper when a school bus stops to pick up or discharge passengers. In this perpendicular position, such a crossing arm will block arriving and departing passengers from crossing immediately in front of a school bus and below the bus drivers field of vision. U.S. Pat. No. 5,357,239, granted to me Oct. 18, 1994, shows such a crossing arm assembly, or "safety gate," that comprises a hollow or solid bar attached at one end to a plastic bracket. The plastic bracket is configured to pivotally mount the bar on a housing.

Others have attempted to provide improved crossing arm arrangements. For instance, U.S. Pat. No. 4,697,541 granted Oct. 6, 1987 to James H. Wicker discloses a crossing arm unit that comprises a short pivot plate. The pivot plate is made of a sturdy, relatively heavy gage metal (e.g. 3.5 in. of 14-gauge steel), a longer support plate of relatively light gauge metal (e.g. 20 in. of 0.08-in. aluminum plate) and a long U-shaped rod (e.g. 4 ft. of ¼-in. aluminum rod). The U-shaped rod serves as a pedestrian barrier.

According to the Wicker patent specification the crossing arm unit is light in weight to avoid structural problems with its support. The unit is easily supported, is simple to construct and is economical to manufacture. The Wicker patent, at column 1, also states that crossing arms have been made of lightweight fiber glass rods and that the Wicker construction improves on these prior art constructions.

However, the Wicker construction is unduly complicated particularly when its assembly requirements are taken into account. Moreover, the long U-shaped rod is fragile, deforms easily and is prone to plastic rather than elastic deformation. The U-shaped rod also requires a strut that further complicates and adds to the expense of the Wicker construction. Furthermore, the U-shaped rod has a narrow profile and is not highly visible. U.S. Pat. No. 5,199,754 granted Apr. 6, 1993 to Lowell J. D. Freeman discloses crossing arm or barrier whose construction includes tubular fiberglass. While the Freeman crossing arm construction is simple in comparison to the Wicker construction, it includes only a single rod that is heavy and rigid.

U.S. Pat. No. 3,153,398, granted Oct. 20, 1964 to George LaVerne Runkle and Gilbert S. Sheets, discloses a crossing arm structure that comprises a channel-shaped section of light sheet metal. The channel-shaped section is stiffened by a U-section having out-turned legs fixed to the back of the channel shaped section. The crossing arm assembly is shaped to fit in a recess in the front bumper of a bus. The assembly also includes a rubber guard structure that has a hollow rectangular center portion that is cemented to the channel section and flange portions that seal off the bumper recess.

This crossing arm structure is unduly complicated and expensive to manufacture. Furthermore the arrangement requires a hinge structure to attach the crossing arm to the bumper. This hinge structure further complicates construction and adds expense.

All the above designs have crossing arms that are cantilevered, i.e., supported by and extending rigidly from only one end. Therefore, a person applying force near the free distal end of any of these arms has a tremendous mechanical advantage over the mechanisms associated with the support and can damage the support or permanently bend or break the arm. If not securely latched to the front of the bus, the inertia of the arm can cause it to swing forward from the bus, uncommanded, whenever the bus decelerates. In addition, an arm supported in this manner is prone to sagging under its own weight. Arm weight can also make it difficult to dampen oscillations that occur when arm rotation is stopped abruptly in the perpendicular extended position.

Therefore, what is needed is a crossing arm that is less massive and therefore has less momentum to cause it to swing forward whenever its host bus stops or slows in traffic. What is also needed is a crossing arm that resists sagging, is configured to withstand considerable abuse, e.g., hinge damage that can result when force is applied along the length of the arm, and is economical to manufacture.

INVENTION SUMMARY

In accordance with this invention a crossing arm assembly is provided that includes a mass-tapered cantilevered beam. The assembly attaches to a support at the front end of a bus to block pedestrian traffic from crossing immediately in from of the bus when the bus is stopped. The crossing arm assembly comprises a combined pivot/bracket that is pivotally attachable to the support. The combined pivot/bracket also includes a beam-mounting portion. The elongated cantilevered beam has a length extending between a beam inner end and a beam outer end. The beam is supported at the beam inner end on the beam-mounting portion of the combined pivot/bracket. The beam is generally mass tapered along the beam length from the beam inner end to the beam outer end. The mass taper concentrates beam mass closer to the support to reduce the tendency of the beam to sag under its own weight and/or to swing forward as the bus decelerates.

According to another aspect of the invention, the cantilever beam is flexible. Cantilever beam flexibility may also increase as a function of beam length as measured from the beam inner end toward the beam outer end. Beam flexibility prevents loads applied near the beam outer end from damaging the support or plastically (permanently) deforming the beam.

According to another aspect of the invention, the beam is tapered in cross-sectional area from the inner end to the outer end. The taper increases flexibility and reduces mass at the beam outer end. The taper obviates the need to construct the beam using a support plate or webbing between two separate parallel rods. The tapered configuration of the beam is sufficiently strong to prevent sagging without using two rods with an interconnecting plate or web.

According to another aspect of the invention, the beam includes a first elongated rod. The first rod has a rod length that extends between a rod butt end adjacent the beam inner end and a rod tip end adjacent the beam outer end. The butt end of the first rod is connected to the beam-mounting portion of the combined pivot/bracket. The rod provides structural support for the beam.

According to another aspect of the invention, the first rod is mass tapered from the butt end to the tip end. The mass taper of the rod concentrates rod mass closer to the beam inner end and the support. This helps reduce beam sag and the tendency for the beam to swing forward.

According to another aspect of the invention, the first rod is tapered in cross-sectional area from the butt end to the tip end. This helps improve flexibility and reduce mass at the tip end of the first rod.

According to another aspect of the invention, the first rod is hollow and has a closed geometric cross section. The hollow construction significantly reduces rod mass.

According to another aspect of the invention, the first rod has an elongated generally frusto-conical shape that is relatively easy and inexpensive to manufacture and provides an aerodynamic profile that presents very little wind resistance.

According to another aspect of the invention, the first rod comprises flexible strips wound in a spiral pattern along the length of the rod. The spiral or helical application of the strips provides strength and flexibility.

According to another aspect of the invention, the first rod comprises a hollow fishing rod body. Fishing rod bodies are commercially available in great quantity and at low cost.

According to another aspect of the invention, a flap is pivotally attached to the first rod. The flap makes the beam highly visible yet provides little wind resistance. This reduces the problem of "wind sailing" that occurs when wind gusts hamper the operation of a crossing arm or cause the and to move, uncommanded.

According to another aspect of the invention, the flap comprises a flap panel disposed below and extending radially downward from and parallel to the first rod. The flap panel may comprise rigid material such as plastic and/or flexible material such as fabric.

According to another aspect of the invention, the flap comprises a flap pivot tube integrally connected along the flap panel upper edge, the flap tube having first and second opposite openings, and a portion of the first rod is disposed within the tube. The tube provides a simple engagement structure for pivotally suspending the flap from the first rod. Annular plugs may be concentrically disposed in the flap tube openings to compensate for rod taper.

According to another aspect of the invention, a second elongated rod may be attached at a butt end of the second rod to the beam-mounting portion of the combined pivot/bracket. The second rod is disposed generally parallel to and spaced below the first rod. A crosspiece may be connected between the tip of the first rod and a tip of the second rod. The resulting structure provides greater beam strength and visibility.

According to another aspect of the invention, the combined pivot/bracket includes two opposing pivot structures that are supported coaxially opposite each other on inner ends of respective upper and lower pivot arms of a U-shaped body. A vertical beam integrally connects outer ends of the pivot arms and a rod-mounting boss extends integrally outward from an outer end surface of the beam. At least one rod receptacle is formed in an outer end surface of the rod-mounting boss and the first rod butt end is disposed coaxially within the receptacle. This combined pivot/bracket construction is easy to manufacture and provides strong, low profile support to the rods and flap.

BRIEF DESCRIPTION OF THE DRAWINGS

To better understand and appreciate the invention, refer to the following detailed description in connection with the accompanying drawings:

FIG. 10 is a front view of a vertical crosspiece of the crossing arm assembly of FIG. 1;

FIG. 11 is a view of the cross piece of FIG. 10 taken from along line 11—11 in FIG. 10;

FIG. 12 is a view of the crosspiece of FIG. 10 taken from along line 12—12 in FIG. 10; and FIG. 13 is a fragmentary front view of an alternate crossing arm assembly.

DETAILED DESCRIPTION OF THE PREFERRED EMBODIMENT

Figure 1:
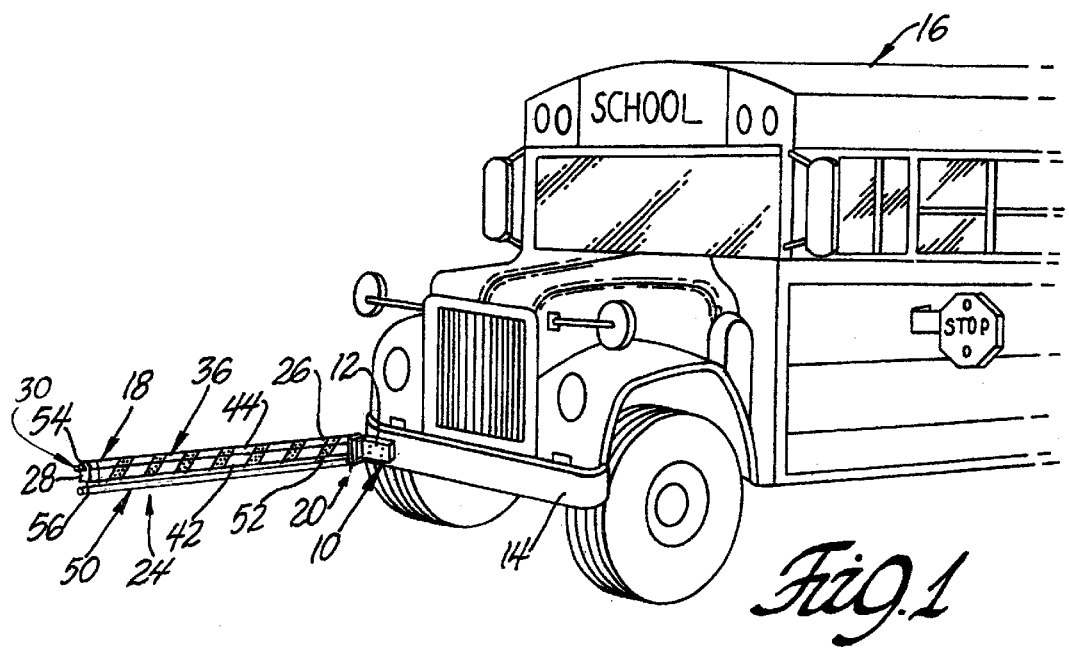
FIG. 1 is a perspective view of a crossing arm assembly constructed according to the present invention and attached to a school bus.

A crossing arm mechanism is generally indicated at 10 in FIG. 1. The crossing arm mechanism 10 comprises a sealed electrical actuator assembly 12 that is shown mounted on the front bumper 14 of a school bus 16 opposite the driver side. A crossing arm assembly, constructed according to the present invention, is generally indicated at 18 in FIG. 1. The crossing arm assembly 18 is hinged on the actuator assembly 12 for pivotal movement. The actuator assembly 12 pivots the crossing arm assembly 18 between a retracted (stored) position adjacent the front bumper 14 of the school bus 16 and an extended (operative) position. In the operative position, the crossing and assembly 18 extends outwardly of the bus bumper 14 in a perpendicular fashion as shown in FIG. 1.

The actuator assembly 12 provides a tamper proof and weatherproof environment for several electrical and mechanical components. These components include an electric motor and a motor control circuit for pivoting the crossing arm assembly 18 back and forth between the stored position and the operative position.

The structure of the actuator assembly 12 is explained in detail in my copending U.S. patent application Ser. No. 08/654,680 filed May 29, 1996 which is incorporated herein by reference. Another suitable actuating device is shown in my prior U.S. Pat. No. 5,357,239 granted Oct. 18, 1994.

Figure 7:
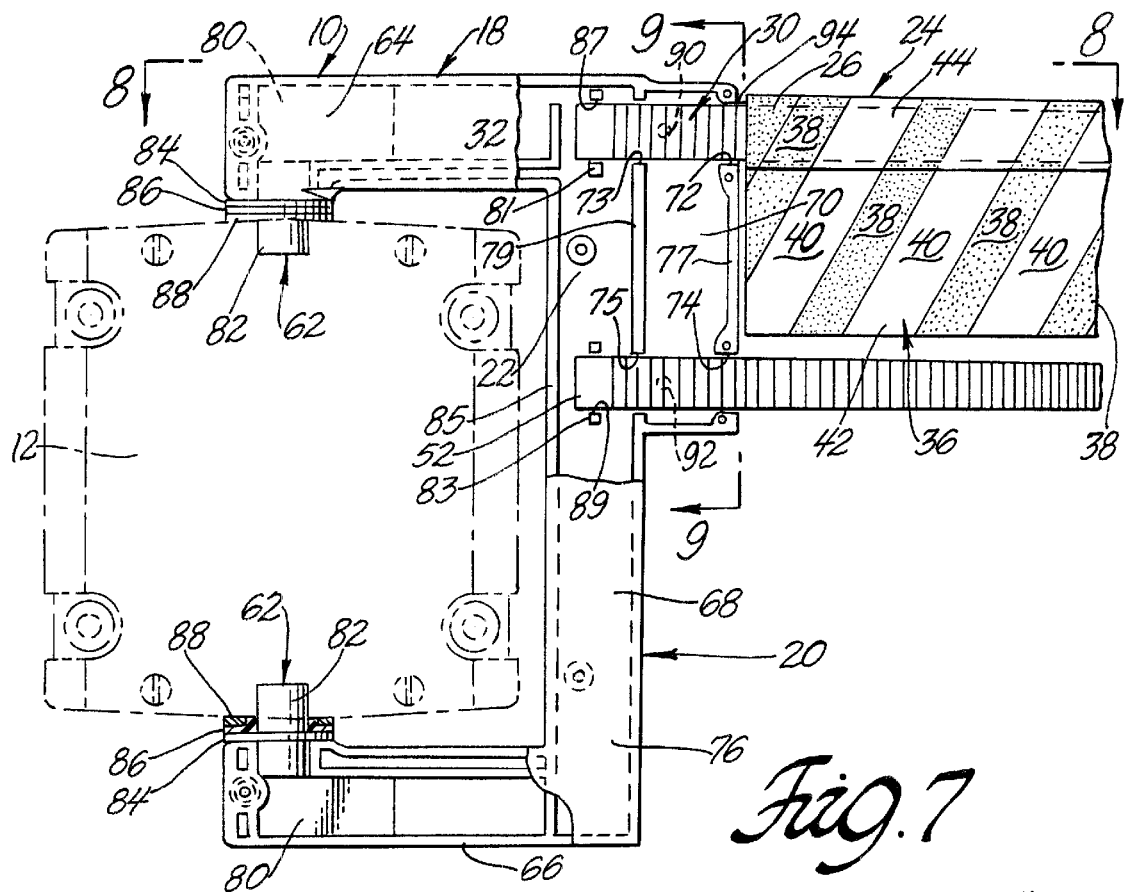
FIG. 7 is a partially cut-away fragmentary front view of an inner end of the crossing arm assembly of FIG. 1.
Figure 8:
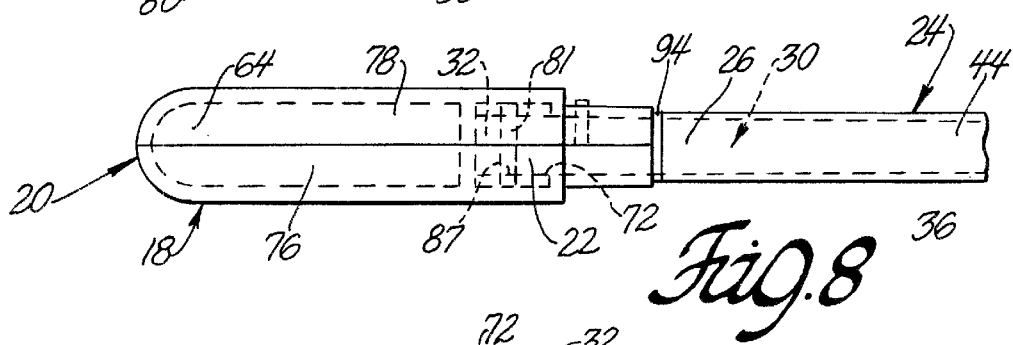
FIG. 8 is a fragmentary top view of an inner end of the crossing arm assembly of FIG. 1.
Figure 9:
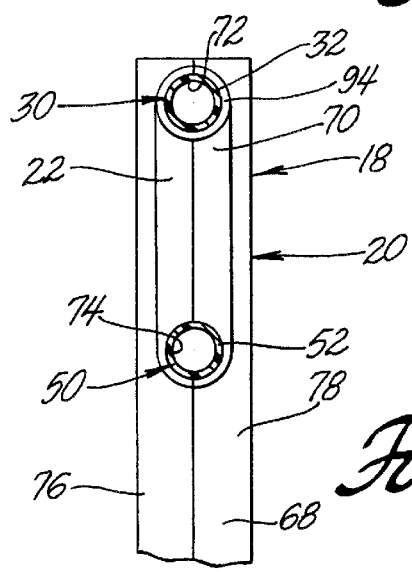
FIG. 9 is a fragmentary, partial-cross-sectional end view taken along line 9—9 of FIG. 7.

The crossing arm assembly 18 pivots to the operative position to block pedestrian traffic from crossing immediately in from of the bus 16 and beneath the driver's field of vision when the bus 16 is stopped. As is best shown in FIGS. 7–9, the crossing arm assembly 18 comprises a combined pivot/bracket 20 configured for pivotal attachment to a support, i.e., the actuator assembly 12. The combined pivot/bracket 20 includes a beam-mounting portion 22. An elongated cantilevered beam 24 is supported at a beam inner end 26 on the beam-mounting portion 22 of the combined pivot/bracket 20.

The beam 24 is generally mass tapered along a length of the beam 24 from the beam inner end 26 to a beam outer end 28. The mass tapering concentrates beam mass closer to the support 12 which reduces the tendency of the beam 24 to sag under its own weight and/or to swing forward as the bus 16 decelerates. In other words, with mass tapering the beam outer end 28 carries less mass and therefore less momentum. Because there is less mass toward the outer end 28 of the beam 24, the beam 24 sags less under its own weight and is less prone to swing forward, uncommanded, when the bus 16 decelerates.

The crossing arm assembly beam 24 is "mass tapered" in that its mass per unit length generally decreases from the beam inner end 26 to the beam outer end 28. Expressed mathematically, the beam mass may be described as comprising a series of differential elements of mass. Each differential element of mass may be assumed to be a thin plate of uniform thickness made of homogeneous material of uniform density. The differential elements of mass are aligned parallel to one another and perpendicular to an axis extending the length of the beam 24. "Mass tapering," then, is an array of differential elements of mass that generally decrease in value as a function of beam length as measured from the beam inner end 26 toward the beam outer end 28.

The cantilever beam 24 is flexible and elastically deformable. Cantilever beam flexibility increases as a function of beam length as measured from the beam inner end 26 toward the beam outer end 28. In other words, the beam 24 is more flexible at its outer end 28 than it is at its inner end 26. Increased flexibility at the beam outer end 28 reduces or eliminates plastic (permanent) deformation in the beam 24 and reduces the amount of force transferred from the beam outer end 28 to the actuator assembly 12. Forces exerted near the beam outer end 28 result in elastic (temporary) beam 24 deformation and do not place high resultant loads on the actuator assembly 12. The inner end of the beam 24 is stiffer to provide support for the outer end 28 and to prevent sagging.

The beam 24 is tapered in cross-sectional area from the beam inner end 26 to the beam outer end 28. Expressed mathematically, the beam volume comprises differential elements of volume that generally decrease in value as a function of beam length as measured from the beam inner end 26 toward the beam outer end 28. Each element of volume is defined by a uniform thickness and by the cross sectional area of the beam 24 as measured at a given point along the beam length. Because the thickness of each differential volume element is the same, the cross sectional area of the volume elements decreases with the length of the beam 24 as measured from the beam inner end 26 toward the beam outer end 28.

The flexibility of the beam 24 is at least partly attributable to the fact that the beam 24 is mass tapered by tapering the cross-sectional area of the beam 24 as described above. The narrower portion of the tapered beam 24 is more flexible and elastically deformable because there is less beam material to resist bending.

As shown in FIGS. 2, 3 and 7–9, the beam 24 includes a first elongated rod 30 having a rod length of approximately 66 inches extending between a rod butt end 32 adjacent the beam inner end 26 and a rod tip end 34 adjacent the beam outer end 28. The butt end 32 of the first rod 30 is connected to the beam-mounting portion 22 of the combined pivot/bracket 20.

Figure 3:
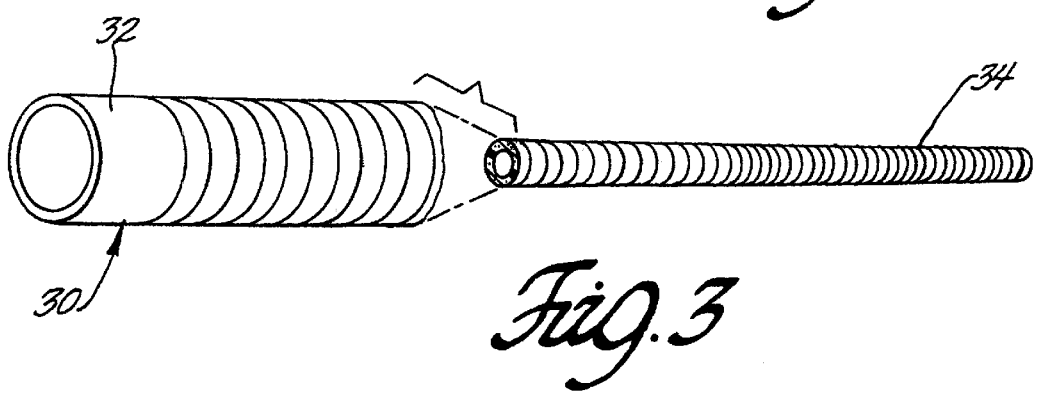
FIG. 3 is a perspective view of a first elongated rod of the crossing arm assembly of FIG. 1.

As best shown in FIG. 3, the first rod 30 is tapered in both mass and cross-sectional area from the butt end 32 to the tip end 34. The first rod 30 is also hollow and has a closed geometric cross section and an elongated generally frusto-conical shape. At its butt end 32, the rod measures approximately ¾" diameter. At its tip end 34, the rod measures approximately 3/16".

Figure 4:
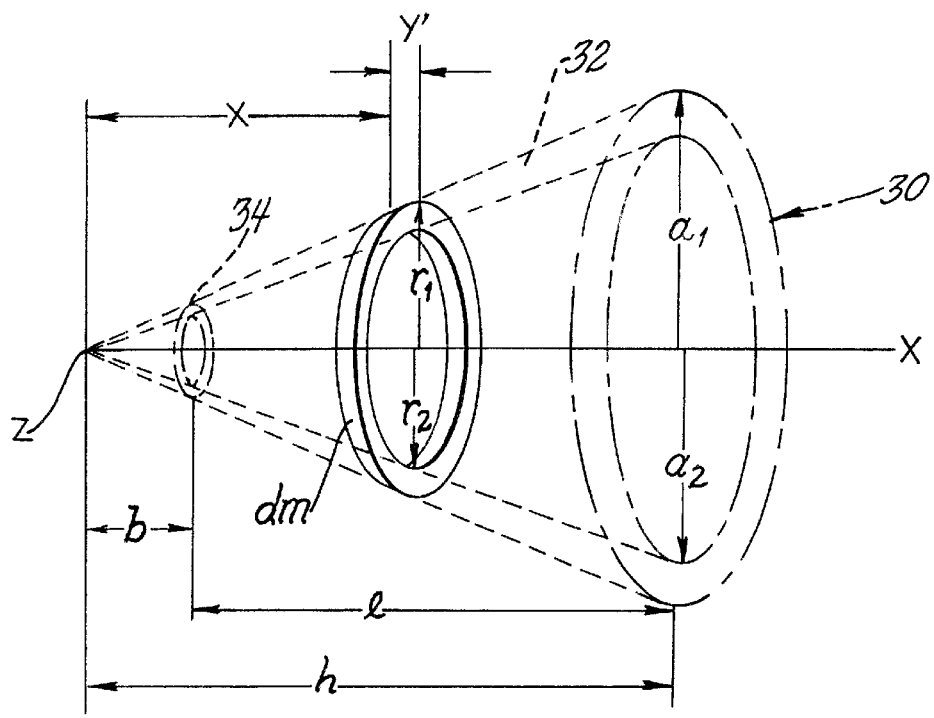
FIG. 4 is a diagrammatic view of a first elongated rod of the crossing arm assembly of FIG. 1.

In the diagram of FIG. 4 a mass tapered hollow frusto-conical rod is shown in phantom. As shown in the FIG. 4 diagram, the total rod mass m may be described as comprising a series of differential elements of mass dm. Each differential element of mass dm may be defined as a thin annular plate of uniform thickness dx and made of homogeneous material of uniform density $\rho$. The differential thickness dx and a cross-sectional area A define each plate. The cross-sectional area A of each plate can be expressed as the difference between the area of a circle of radius $r_1$ and the area of a circle of radius $r_2$: $A=\pi(r_1^2-r_2^2)dx$. Therefore, each differential element of mass dm may be described by the equation $dm=\rho A dx=\rho\pi E(r_1^2-r_2^2)dx$. As shown in FIG. 4, for a cone, $r_1=a_1^2/h^2\ x^2\ dx$ and $r_2=a_2^2/h^2\ x^2\ dx$. Therefore, each differential element of mass $dm=\rho\pi\ x^2/h^2\ (a_1^2-a_2^2)dx$.

The differential elements of mass dm are aligned parallel to one another and perpendicular to an x-axis extending coaxially along the length of the first rod 30. The differential elements of mass dm generally decrease in value as a function of rod length I as measured from the butt end 32 of the first rod 30 toward the tip end 34 of the first rod 30. In the FIG. 4 diagram, the butt end 32 of the first rod 30 is disposed a distance b from the grid origin along the x-axis. The tip end 34 of the first rod 30 is disposed a distance h from the grid origin along the x-axis. Therefore, the total mass m of the first rod 30 may be expressed as the integral, from h to b of the differential elements of mass dm.

The first rod is a commercially available fishing rod body comprising flexible strips of fiberglass wound in a spiral pattern as is best shown in FIG. 3. The rod 30 shown in the figures is one of many commercially available fishing rod bodies that are suitable for use in a crossing arm assembly constructed according to the present invention. U.S. Pat. Nos. 4,015,360; 4,555,113; 5,076,004; 5,324,558; 5,538,769 and 5,592,771 describe other suitable rod bodies.

An elongated flap, generally indicated at 36 in FIGS. 1, 2 and 5–8, is pivotally attached to and suspended from the first rod 30. As is best shown in FIG. 7, the flap 36 is colored with alternating diagonal black 38 and yellow 40 safety stripes. The stripes make the beam 24 more visible and help to identify the function of the beam 24. In other embodiments, a plurality of flaps may be suspended from the first rod 30 instead of a single long flap 36 as shown in FIG. 13.

The flap 36 comprises a rectangular flap panel 42 and a cylindrical flap pivot tube 44. The flap panel 42 and pivot tube 44 are integrally formed as a single unitary piece with the flap panel 42 extending radially outward from and parallel to the pivot tube 44. The flap pivot tube 44 is, therefore, integrally connected to the flap panel 42 along an upper edge of the flap panel 42. The flap 36 is cut from an elongated extruded strip (not shown).

Figure 5:
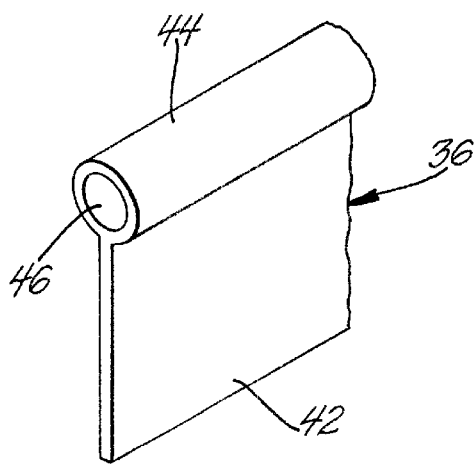
FIG. 5 is a perspective view of a flap portion of the crossing arm assembly of FIG.

As is best shown in FIG. 5, there are openings 46 disposed at either end of the flap tube 44 to allow each flap 36 to be slid onto the first rod 30 during assembly. Therefore, following assembly, a portion of the first rod 30 is disposed within the flap tube 44. In other words, the flap 36 is supported on the first rod 30 with the first rod 30 extending through the flap pivot tube 44. The flap panel 42 is suspended below and extends radially downward from and parallel to the first rod 30. The clearance between the tapered outer diameter of the first rod 30 and the inner diameter of the pivot tube 44 is sufficient to allow the flap 36 to swing freely on the first rod 30.

Figure 2:
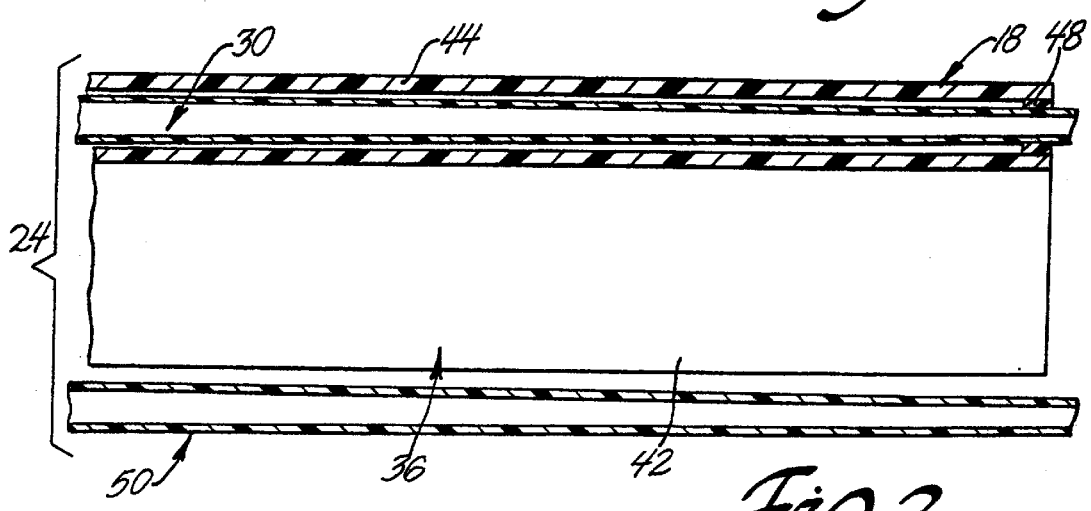
FIG. 2 is a fragmentary front view of the crossing arm assembly of FIG. 1.

An annular plug, shown at 48 in FIG. 2, is concentrically and coaxially supported within the opening 46 adjacent the tip of the first rod 30. The plug 48 may be secured either by interference fit or any other fastening means known in the art, e.g., by adhesive application or threading. The plug 48 is slidably and rotatably disposed around the first rod 30. In other words, the clearance between the tapered outer diameter of the first rod 30 and inner diameter of the annular plug 48 is sufficient to allow the flap 36 to swing freely on the first rod 30. The plug 48 compensate for narrowing pole outer diameter and allows the flap tube 44 to be formed with a constant inner diameter along its length.

A second elongated, hollow, frusto-conical rod, generally identical to the first rod 30, is generally indicated at 50 in FIGS. 1, 2, 6, 7 and 9, has a butt end 52 attached to the beam-mounting portion 22 of the combined pivot/bracket 20. The second rod 50 is disposed generally parallel to and is spaced approximately 3⅝" below the first rod 30. This space between the two rods 30, 50 is sufficient to allow the flap 36 to swing freely on the first rod 30 without contacting the second rod 50.

Figure 6:
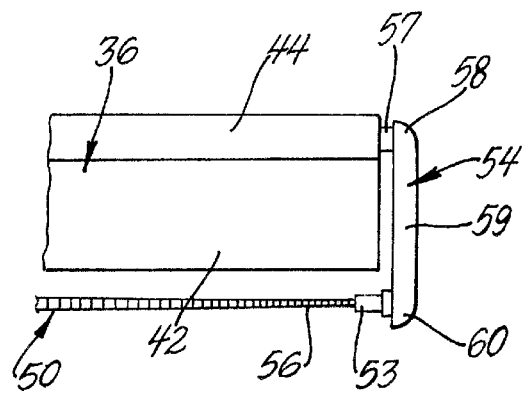
FIG. 6 is a fragmentary front view of an outer end of the crossing arm assembly of FIG. 1.

A rigid plastic vertical crosspiece, shown at 54 in FIGS. 1, 6, and 10–12, connects the tip 34 of the first rod 30 to a tip 56 of the second rod 50. The crosspiece 54 includes a main body portion 59 having first and second crosspiece ends 58, 60. The first crosspiece end 58 is connected to the tip of the first rod 30 and the second crosspiece end 60 is connected to the tip 56 of the second rod 50. As shown in FIGS. 1 and 6, the cross piece 54 holds the rod tips 34, 56 together and causes the two rods 30, 50 to move together as a single beam 24 between the stored and operative positions. The main body 59 of the crosspiece 54 is hollow to minimize mass at the outer end 28 of the beam 24.

As is best shown in FIGS. 10 and 11, the crosspiece includes a pair of annular posts 53. Each post 53 is hollowed to form a tip receptacle 55 for receiving one of the rod tips 34, 56. An annular flap-spacer boss 57 is co-axially disposed around the post 53 adjacent the first crosspiece end 58. The annular flap-spacer boss spaces the flap 36 approximately ⅛" away from the main body portion 59 of the crosspiece 54 to prevent the flap 36 from contacting and binding on the main body portion 59 as the flap 36 swings from the first rod 30.

The rod tips 34, 56 are held in the receptacles 55 by adhesive. In other embodiments, the rod tips 34, 56 may be secured within the receptacles 55 by a transverse setscrew or any other suitable retaining means known in the art.

As best shown in FIG. 7, the combined pivot/bracket 20 has a U-shaped plastic pivot portion. Two opposing pivot pins 62 are supported coaxially opposite each other on inner ends of respective upper 64 and lower 66 hollow pivot arms of the pivot portion. A hollow vertical beam 68 integrally connects outer ends of the pivot arms 64, 66. A hollow rod-mounting boss portion of the combined pivot/bracket 20, shown at 70 in FIGS. 7–9, extends integrally outward from an outer end surface of the vertical beam 68. The boss measures approximately 5" from a lower end of the boss to an upper end of the boss.

First and second outer receptacle apertures 72, 74 are formed through an outer end wall 77 of the rod-mounting boss 70 adjacent the respective upper and lower ends of the boss. First and second middle receptacle apertures 73, 75 are formed through an outer vertical beam wall 79 in coaxial alignment with the outer receptacle apertures 72, 74. First and second square webs 81, 83 are formed within the vertical beam 68 between an inner vertical beam wall 85 and the outer vertical beam wall 79. First and second inner receptacle apertures 87, 89 are formed through respective first and second webs 81, 83 and are coaxially aligned with the respective middle and outer receptacle apertures 73, 75; 72, 74. The inner, middle and outer receptacle apertures are sized and aligned to receive and hold the butt ends 32, 52 of the respective first and second rods 30, 50.

To preclude the rod butt ends 32, 52 from sliding out of the receptacle apertures, set screws 91 are threaded through each of two screw apertures 90, 92 in a back wall of the rod-mounting boss 70 and into the respective rod butt ends 32, 52.

An annular boss 94 extends integrally outward approximately ⅛" from the outer end wall 77 of the rod-mounting boss 70 and is disposed concentrically around the first outer receptacle aperture 72. The first and second rod butt ends 32, 52 are disposed coaxially within the respective upper and lower rod receptacles 72, 74. The first rod butt end 32 also passes through the annular boss 94. The annular boss 94 spaces the flap 36 from the outer end wall 77 to prevent the flap from contacting and binding on the outer end wall 77.

The pivot portion of the combined pivot/bracket 20 measures approximately 11" from a lower surface of the lower pivot arm 66 to an upper surface of the upper pivot arm 64. The combined pivot/bracket 20 measures approximately 6⅞" from a distal end of the upper pivot arm 64 to the outer end surface of the boss portion 70. The crossing arm assembly 18 measures approximately 72" from the upper pivot pin 82 to the outer end of the crosspiece 54.

As best shown in FIGS. 8 and 9, the combined pivot/bracket 20 is divided into front 15 76 and rear 78 molded parts that are substantially mirror images of each other. The combined pivot/bracket parts 76, 78 are secured together to form the combined pivot/bracket 20. As shown in FIG. 7, each hollow pivot arm 64, 66 holds a plastic elbow 80 that includes a vertical pivot pin 82. Each vertical pivot pin 82 extends outwardly of an integral circular flange 84. Opposite faces of each flange 84 engage the pivot arm 64, 66 20 and a journal portion 86 of the actuator assembly 12, respectively. A flanged brass bearing ring 88 may be provided between each flange 84 and the journal portion 86 of the actuator assembly 12.

In other embodiments, the second rod 50, the vertical crosspiece 54, and the flap 36 may be omitted In other embodiments, the mass tapering of the individual rods 30, 50 and/or the beam 24 may not be linear. In other words, the rate that the mass of each differential mass unit decreases along the length of the beam 24 may vary. In fact, the mass may actually increase at certain points along the beam 24 so long as the overall trend is a decrease in mass from the beam inner end 26 to the beam outer end 28. In addition, the cross-sectional size and shape of either or both rods 30, 50 may vary with length.

In other embodiments, the first 30 and second 50 rod need not be identical. In addition, the first rod 30 and/or second rod 50 could be solid to increase rod strength. However, this strength increase would be accompanied by an increase in mass. The construction of either or both rods 30, 50 could include other suitable materials such as graphite in addition to or in place of fiberglass.

The flap panels 42 may comprise a flexible material such as an oilcloth fabric rather than rigid plastic. Rather than being identical to one another, the flap panels 42 may have flap tubes of graduated diameters to compensate for decreased rod diameter toward the tip end 34 of the first rod 30.

The description and drawings illustratively set forth my presently preferred invention embodiments. I intend the description and drawings to describe these embodiments and not to limit the scope of the invention. Obviously, it is possible to modify these embodiments while remaining within the scope of the following claims. Therefore, within the scope of the claims, one may practice the invention otherwise than as the description and drawings specifically show and describe.

I claim:

1. A crossing arm assembly that pivotally attaches to a support at the front end of a bus to block pedestrian traffic from crossing immediately in front of the bus when the bus is stopped, the crossing arm assembly comprising:
   a combined pivot/bracket pivotally attachable to the support, the combined pivot/bracket including a beam mounting portion;
   an elongated cantilevered beam having a length extending between a beam inner end and a beam outer end, the beam supported at the beam inner end on the beam mounting portion of the combined pivot/bracket;
   the beam being generally mass tapered along the beam length from the beam inner end to the beam outer end to concentrate beam mass closer to the support to reduce the tendency of the beam to sag under its own weight and/or to swing forward as the bus decelerates, and
   the beam including a flexible elongated rod having a rod length extending between a rod butt end adjacent the beam inner end and a rod tip end adjacent the beam outer end, the butt end of the rod connected to the beam mounting portion of the combined pivot/bracket without any additional structure being provided to prevent sagging.

2. A crossing arm assembly as defined in claim 1 in which the flexible elongated rod is mass tapered from the butt end to the tip end.

3. A crossing arm assembly as defined in claim 1 in which the flexible elongated rod is tapered in cross-sectional area from the butt end to the tip end.

4. A crossing arm assembly as defined in claim 1 in which the flexible elongated rod is hollow and has a closed geometric cross section.

5. A crossing arm assembly as defined in claim 1 in which the flexible elongated rod comprises a hollow, elongated frusto-conical tube.

6. A crossing arm assembly as defined in claim 1 and including a second flexible elongated rod having a length extending between a butt end and a tip end of the second flexible elongated rod, the butt end of the second flexible elongated rod attached to the beam-mounting portion of the combined pivot/bracket, the second flexible elongated rod disposed generally parallel to and spaced below the first flexible elongated rod.

7. A crossing arm assembly that pivotally attaches to a support at the front tend of a bus to block pedestrian traffic from crossing immediately in front of the bus when the bus is stopped, the crossing arm assembly comprising:
   a combined pivot/bracket pivotally attachable to the support, the combined pivot/bracket including a beam mounting portion;
   an elongated cantilevered beam having a length extending between a beam inner end and a beam outer end, the beam supported at the beam inner end on the beam mounting portion of the combined pivot/bracket;
   the beam being generally mass tapered along the beam length from the beam inner end to the beam outer end to concentrate beam mass closer to the support to reduce the tendency of the beam to sag under its own weight and/or to swing forward as the bus decelerates,
   the beam including a flexible and elastically deformable elongated rod having a rod length extending between a rod butt end adjacent the beam inner end and a rod tip end adjacent the beam outer end, the butt end of the flexible elongated rod connected to the beam mounting portion of the combined pivot/bracket,
   a flap being pivotally attached to the flexible elongated rod, the flap extending substantially from the butt end to the tip end of the flexible elongated rod.

8. A crossing arm assembly as defined in claim 7 in which the flap comprises:
   one or more flap panels disposed below and extending radially downward from and parallel to the flexible elongated rod; and
   the one or more flap panels each having a flap pivot tube integrally connected along an upper edge of the flap panel, the flap pivot tube having first and second opposite openings, and a portion of the flexible elongated rod is disposed within the flap pivot tube.

9. A crossing arm assembly as defined in claim 8 in which the flexible elongated rod is frusto-conical and each flap pivot tube of the one or more flap panels has a constant inner diameter, an annular plug is concentrically disposed in at least one of the first and second openings of each flap pivot tube and the plug is slidably and rotatably disposed around the flexible elongated frusto-conical rod to compensate for outer diameter changes of the flexible elongated frusto-conical rod.

10. A bus having a crossing arm assembly that is pivotally attached to a support at the front end of the bus to block pedestrian traffic from crossing immediately in front of the bus when the bus is stopped, the crossing arm assembly comprising:
    a combined pivot/bracket pivotally attached to the support, the bracket including a beam mounting portion;
    an elongated flexible rod having a rod length extending between a butt end and a tip end of the rod, the butt end of the rod connected to the beam mounting portion of the combined pivot/bracket without any additional structure being provided to prevent sagging;
    the elongated flexible rod being generally tapered in mass and in cross-sectional area from the butt end to the tip end.

11. The bus as defined in claim 10 in which the elongated flexible rod is hollow and has an elongated generally frusto-conical shape.

12. A crossing arm assembly that pivotally attaches to a support at the front end of a bus to block pedestrian traffic from crossing immediately in front of the bus when the bus is stopped, the crossing arm assembly comprising:
    a combined pivot/bracket pivotally attachable to the support, the combined pivot/bracket including a pivot portion and a boss portion;
    a first elongated flexible and elastically deformable rod having a rod length extending between a butt end and a tip end of the first rod, the butt end of the first rod connected to the boss portion of the combined pivot/bracket;

a second elongated flexible and elastically deformable rod having a length extending between a butt end and a tip end of the second rod, the butt end of the second rod attached to the boss portion of the combined pivot/bracket, the second rod spaced below the first rod;

the first and second rods being generally mass tapered along the respective lengths of the rods from the respective rod butt ends to the respective rod tip ends.

13. A crossing arm assembly as defined in claim 12 in which the first and second rods are tapered in cross-sectional area from the respective butt ends of the rods to respective outer ends of the rods.

14. A crossing arm assembly as defined in claim 12 in which the first and second rods are hollow and have respective closed geometric cross sections.

15. A crossing arm assembly that pivotally attaches to a support a the front end of a bus to block pedestrian traffic from crossing immediately in front of the bus when the bus is stopped, the crossing arm assembly comprising:

a combined pivot/bracket pivotally attachable to the support, the combined pivot/bracket including a pivot portion and a boss portion;

a first elongated flexible and elastically deformable rod having a rod length extending between a butt end and a tip end of the first rod, the butt end of the first rod connected to the boss portion of the combined pivot/bracket;

a second elongated flexible and elastically deformable rod having a length extending between a butt end and a tip end of the second rod, the butt end of the second rod attached to the boss portion of the combined pivot/bracket, the second rod spaced below the first rod; and a cross piece having a first end connected adjacent the tip end of the first rod and a second end connected adjacent the tip end of the second rod.

16. A crossing arm assembly that pivotally attaches to a support at the front end of a bus to block pedestrian traffic from crossing immediately in front of the bus when the bus is stopped, the crossing arm assembly comprising:

a combined pivot/bracket pivotally attachable to the support, the combined pivot/bracket including a beam mounting portion;

an elongated cantilevered beam having a length extending between a beam inner end and a beam outer end, the beam supported at the beam inner end on the beam mounting portion of the combined pivot/bracket;

the beam being generally mass tapered along the beam length from the beam inner end to the beam outer end to concentrate beam mass closer to the support to reduce the tendency of the beam to sag under its own weight and/or to swing forward as the bus decelerates, and the beam including a flexible and elastically deformable elongated rod having a rod length extending between a rod butt end adjacent the beam inner end and a rod tip end adjacent the beam outer end, the butt end of the rod connected to the beam mounting portion of the combined pivot/bracket.

17. A crossing arm assembly as defined in claim 16 in which the rod is hollow and has an elongated generally frusto-conical shape.

18. A crossing arm assembly as defined in claim 16 in which the rod comprises a hollow, elongated frusto-conical tube.

19. A bus having a crossing arm assembly that is pivotally attached to a support at the front end of the bus to block pedestrian traffic from crossing immediately in front of the bus when the bus is stopped, the crossing arm assembly comprising:

a combined pivot/bracket pivotally attached to the support, the bracket including a beam mounting portion;

an elongated flexible and elastically deformable rod having a rod length extending between a butt end and a tip end of the rod, the butt end of the rod connected to the beam mounting portion of the combined pivot/bracket;

the elongated flexible and elastically deformable rod being generally tapered in mass and in cross-sectional area from the butt end to the tip end.

20. The crossing arm assembly as defined in claim 19 in which the elongated flexible and elastically deformable rod is hollow and has an elongated generally frusto-conical shape.

* * * * *

UNITED STATES PATENT AND TRADEMARK OFFICE
CERTIFICATE OF CORRECTION

PATENT NO. : 6,477,978 B2
DATED : November 12, 2002
INVENTOR(S) : Ronald C. Lamparter It is certified that error appears in the above-identified patent and that said Letters Patent is hereby corrected as shown below:

Column 1,
Line 33, after "pedestrian barrier." delete paragraph space (combine into one paragraph)
Line 49, after "highly visible." insert new paragraph Column 2,
Line 30, after "immediately in", delete "from" and insert therein -- front --

Column 3,
Line 29, after "cause the" delete "and" insert therein -- arm --

Column 4,
Line 12, after "Fig." insert therein -- 1; --
Line 44, after "crossing" delete "and" and insert therein -- arm --
Line 61, after "immediately in" delete "from" and insert therein -- front --

Column 6,
Line 20, after "pn" delete "E"
Line 21, after "r,=", delete "$a^{12}$" and insert -- $a^2$, --
Line 27, after "length" delete "I" and insert therein -- L --

Column 7,
Line 14, after "plug 48" delete "compensate" and insert therein -- compensates --

Column 8,
Line 36, after "front" delete "15"
Line 43, after "66" delete "20"
Line 49, after "omitted" insert -- . --

Column 9,
Line 60, before "of a bus" delete "tend", and insert -- end --

Column 10,
Line 53, after "the" delete "bus" and insert -- crossing arm assembly --

UNITED STATES PATENT AND TRADEMARK OFFICE
CERTIFICATE OF CORRECTION

PATENT NO. : 6,477,978 B2
DATED : November 12, 2002
INVENTOR(S) : Ronald C. Lamparter It is certified that error appears in the above-identified patent and that said Letters Patent is hereby corrected as shown below:

Column 11,
Line 17, after "support" delete "a" and insert therein -- at --

Signed and Sealed this

Fifth Day of August, 2003

JAMES E. ROGAN
*Director of the United States Patent and Trademark Office*